June 18, 1940.　　　　F. G. HODSDON　　　　2,204,677
MILKER CLAW
Filed Nov. 13, 1936　　　　2 Sheets-Sheet 2

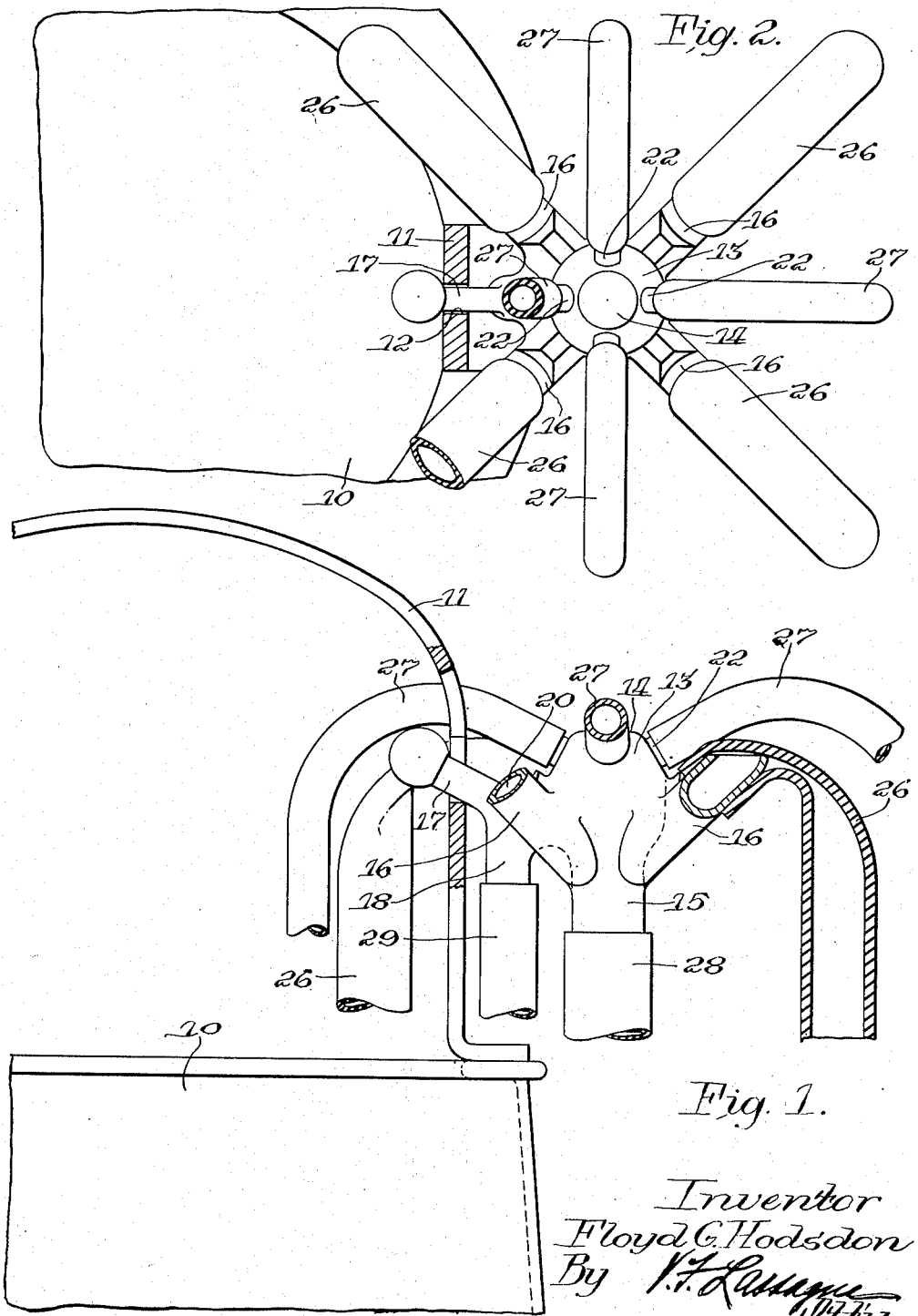

Inventor
Floyd G. Hodsdon
By
Atty.

Patented June 18, 1940

2,204,677

UNITED STATES PATENT OFFICE 2,204,677

MILKER CLAW

Floyd G. Hodsdon, Milwaukee, Wis., assignor to International Harvester Company, a corporation of New Jersey Application November 13, 1936, Serial No. 110,691

10 Claims. (Cl. 31—83)

This invention relates to a milker claw used in milking machines.

These claws, as is well known in the art, are the connections between the four teat cups and the main milk hose and also are the connection between the four teat cup air hoses and the main pulsation hose from the pulsator. When a claw is made from a sand casting, its exterior is rough and usually pitted, and sometimes porous, resulting in scrap losses and extra work for putting on a smooth outside surface. Heretofore they have generally been made of several parts, screwed or clamped together, which results in claws that are unsanitary and inconvenient to clean. They comprise a body including four nipples to receive respectively four hose connections for milk and vacuum, and also four similar smaller nipples providing pulsation air conduits. The body also included a single nipple for supplying vacuum to and conducting milk from the four milk nipples mentioned, and another conduit served as a pulsator air connection in communication with the four air nipples. Also, on its vertical axis, the claw carried a vertical, centrally disposed, headed shank at its upper end, which was used in detachably hooking the claw to the handle on the milk pail of the milking machine, when transferring the pail and teat cups from one cow to another. When the claw of this old type was hung on the pail, the claw had to be tilted out of its vertical axis, so that the teat cup rubber milk hoses would not hang symmetrically over the bevel ends of the claws, to prevent leakage of vacuum, and, as a result the vacuum would not be shut off automatically by the claw, and it was required that some other hand turn-off valve be operated to cut off the vacuum and prevent its dissipation.

Further, such cast claws were unusually heavy because additional metal had to be provided for machining and finishing operations, which increased the cost of manufacturing such claws. Further, the cored passages connecting the four like conduits with their main supply conduit in the usual H-shaped claw would leave a blind end that had to be closed up with a screw cap, which had to be removed when passing a brush through the conduits to clean them effectively.

With these problems in mind, this invention more particularly relates to the provision of a claw that will lend itself to a forging operation, so that stronger, more impervious metals may be used to make thinner walls, to lessen the weight of the claw and also to facilitate the drilling out of the nipple passages, so that smooth conduit contours will be provided, with no dead ends, which can readily be cleaned when a brush is passed through the conduits. Further, to facilitate the forging operation, the headed stud used in hanging the claw from the handle of the milker pail is located at one side of the body of the claw and at the same angular position as the milk and vacuum nipples, whereby, when the claw is hung from the pail, all four of the milk hoses will hang over the end of the nipples automatically to cut off the vacuum without the necessity of having to manipulate a hand cut-off valve. Further, the claw is so designed that it can be forged integrally in a two part die, including the headed stud, thereby eliminating all external machining operations.

It is, therefore, the main object of this invention to provide an improved milker claw.

Another object of the invention is to provide a claw which will lend itself to forging.

Another object of the invention is to provide a claw having a headed stud member extending from the side of its body rather than upwardly along its vertical axis, so that, when the claw is hung from the handle of the milker pail, all four milk nipples will have their cut-off edges lying in a common horizontal plane, whereby all four milk hoses will automatically shut off over the nipple ends automatically to cut off the vacuum.

Another object of the invention is to provide a forged claw having the parting line of the dies disposed on a conical surface, with the said surface cutting through the axis of each milker nipple and the headed stud.

Other important objects should be apparent to those skilled in this art as the disclosure is more fully made.

These important objects briefly are achieved in the provision of a claw having a body portion from which angularly extend four milk nipple projections, the axis of each projection lying on the surface of a common cone along with a headed stud projection also having its axis disposed on the surface of the same cone. Along the vertical axis of the body is an upstanding projection and below the body on the same axis is a depending projection. Offset from the depending projection is another depending projection having an axis parallel with the axis of the first mentioned depending projection. The four milk nipple projections are drilled out with the passages intersecting in the center of the body, so that all four bores will communicate with a drilled hole in the coaxially depending projection. The projection on top of the claw is provided with four drilled holes to receive four separate nipples which are respectively passed into the holes and fastened thereinto, as by soldering, and the other depending projection, adjacent to the vertical central axis of the body, is drilled to communicate with the last four aforementioned passages. So much will suffice to give a general understanding of the improved claw invention which is illustrated in the accompanying sheets of drawings, wherein:

Figure 1 is a general side elevational view of the improved milker claw, showing the various positions assumed by the milk and air conduits when the claw is hung on the handle of the milk pail, the view showing the four milk hoses hanging over the milk nipples to cut off the vacuum;

Figure 2 is a plan view of the structure shown in Figure 1;

Figure 3:
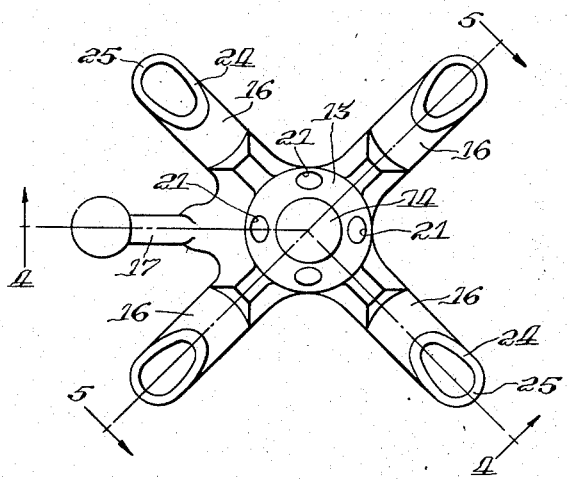
Figure 3 is a plan view of the finished nipple per se.

For the sake of illustration, there has been shown a conventional milking machine pail 10, said pail having a handle 11 provided with a slot 12 in a vertical portion of said handle 11.

The milker claw comprises a concentric, circular body portion 13 which, in its normal position, when used in milking or when hanging on the pail, has a vertical axis, and which, above the body on said axis, carries a concentric upper projection 14, while below the body is an axially depending projection 15. From the body in equidistantly spaced angular distances four upwardly inclined projections 16 extend and, between two of these projections, is a headed stud projection 17. Offset from the body 13 below the stud projection 17, is a depending projection 18 having an axis parallel with the axis of the downward projection 15.

The projection 15 is drilled along the vertical axis to provide a conduit 19, which in the lower portion of the body 13 communicates with four drilled passages 20 formed in each of the nipple projections 16. Similarly, the upper projection 14 of the body is drilled to provide four passages 21, which are upwardly inclined, so that four air conduits 22 may be drive-fitted into the portion 21 and additionally held in place by means of soldering, if desired. It will be noted that the axes of the passages 21 lie on the surface of an imaginary cone. One of the drilled passages 21, as shown at 21', is drilled through the body to meet a drilled passage 23 formed in the depending projection 18. The upper end of each milker nipple or vacuum nipple 16 is cut off horizontally, so that all four upper ends of the said nipples 16, as indicated at 24, will lie in a common horizontal plane. Further, each said nipple 16 is provided with a bent-in outer edge 25, so that the teat cups, (not shown), supported by the rubber hoses 26, are placed over said nipples and the weight hanging on said hoses will lay tight over the edges 25, as shown in Figure 1, to cut off vacuum in said hoses 26. The four nipples 22 receive respectively air hoses 27 from the nipple conduit 23 connected to the pulsator, and the nipple conduit 19 supplies vacuum to the milk or vacuum conduits 20. In Figure 1, a main milk hose 28 is connected to the nipple 15 and a main pulsator air hose 29 is connected to the nipple 18.

Figure 6:
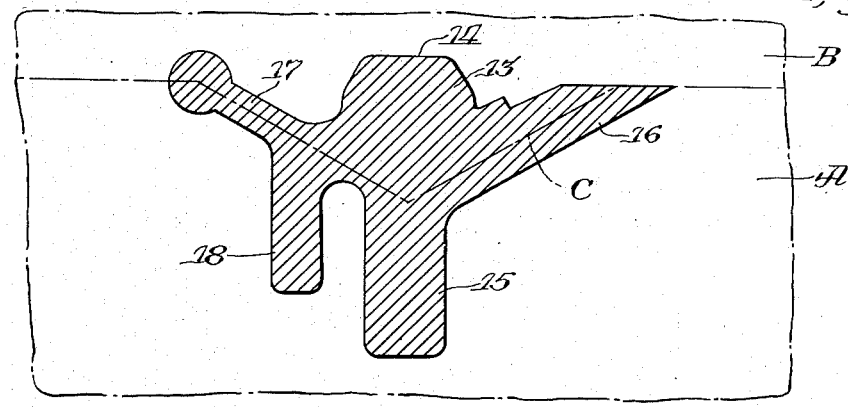
Figures 4, 5:
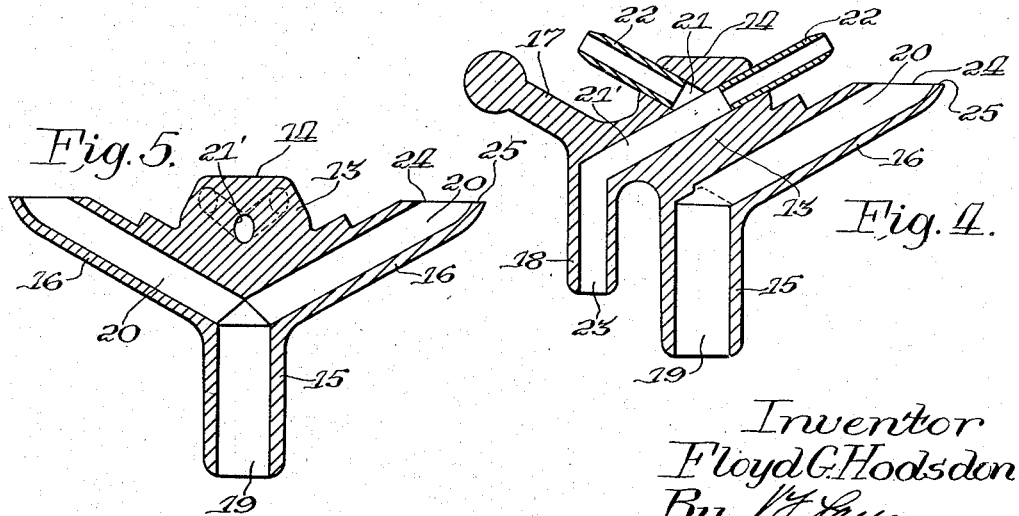
Figure 4 is a cross sectional view through the finished nipple per se, as viewed along the line 4—4 of Figure 3, looking in the direction of the arrows.
Figure 5 is a plan view through the nipple taken along the line 5—5 of Figure 3, looking in the direction of the arrows; and, Figure 6 is an illustration showing the nipple in cross section to illustrate the forging operation and the parting line of the forging dies.

It is to be noted that the body of the claw, as shown in Figure 6, may be delineated by a dot and dash line, which dot and dash line lies on the surface of a cone, so that the axes of the four nipples 16 and the projection 17 all lie on the surface of said cone. For the sake of illustration, the lower die block is illustrated in Figure 6 by A and the upper die block is illustrated by B, and the parting line of the dies, which lies on the conical surface mentioned, is indicated at C.

It can now be seen that in one forging operation the complete exterior surface of the claw may be simply forged as an integral piece. The forging operation can be accomplished with such a smooth surface that but little polishing is required for nickel plating. Therefore, all that is necessary to do is to drill the conduits as described and to insert and solder into place the four air nipples 22. Thus, the number of separately mounted nipples is reduced to a minimum, for it is not necessary separately to mount and solder into place the four milk nipples 16, as they are drilled in the forged projections provided for that purpose. After the drilling, all that need be done is to shape the upper ends of the nipples 16 in the manner described, so that they will perform their cut-off action on the milk hoses 26. The point of communication between the four milk conduits 20 with the main milk conduit 19 is smooth and leaves no dead ends to interfere with the free passage of a cleaning brush in cleaning, because the bristles near the end of the brush pass by any of the five passages into the clear open space in the center.

Further, the claw with the ball stud 17 at one side makes it possible to hang the claw in the fashion shown in Figure 1 where all four hoses 26 will hang evenly over the lips 25 of the conduits 16 for the advantageous reason heretofore mentioned. Also in this position, the claw is in the correct or natural position which it should assume when the operator is applying the teat cups to the cow.

There is another advantage in locating the headed stud 17 to one side, for heretofore, when the headed stud was placed on the vertical axial line of the claw body above the part 14, it was impossible to forge it to shape. In such situation all that could be forged would be a cylindrical projection standing vertically, which later on would have to be machined away to provide the ball head. Thus, by locating the headed stud to the side in accordance with this invention, the forging operation forms the final shape, and, incidentally, in use the side mounting has marked advantages.

It can now be seen that the claw of this invention achieves the desirable objects heretofore recited.

It is the intention to cover herein all such changes and modifications of the example shown for purposes of illustration which do not in material respects constitute departures from the spirit and scope of the invention as defined in the appended claims.

What is claimed is:

1. A milker claw having a body, vacuum nipples extending from the body having axes lying on a common surface of a cone, and air nipples spaced from the vacuum nipples and lying on a common surface of another cone, there being an air supply passage in the body extending from the apex of the cone of the air nipples through the cone of the vacuum nipples.

2. A milker claw having a body, nipples extending therefrom, and a hanger stud extending therefrom, said nipples and stud having respective axes lying on a common conical surface.

3. A milker claw having a body, four vacuum nipples extending therefrom, four air nipples extending therefrom, a main vacuum supply nipple communicating in the body with said vacuum nipples, and a main air supply nipple communicating in the body with the air nipples by means of a passage in the body extending directly between two adjacent vacuum nipples but not in communication with them, said main vacuum and main air nipples having parallel axes.

4. In a milker, a pail having a handle formed with a slot, the combination with said handle of a claw comprising a body including a plurality of nipples extending angularly from the lengthwise axis of the body in equidistantly angularly spaced relationship, the nipples respectively carrying vacuum hoses and having ends respectively lying in a common plane, said body also having at one side a hanger stud adapted to be used in hanging the claw from the slot in the handle whereby the nipple end plane is horizontally disposed and the hoses all kink over the ends to cut off the vacuum therein.

5. A milker claw having a body formed with four substantially radially extending projections, an axial projection, a second projection parallel with the axial projection, and a headed projection disposed substantially radially and between two of the four radially extending projections.

6. A milker claw having a body formed with four substantially radially extending projections, an axial projection, a second projection parallel with the axial projection, and a headed projection disposed substantially radially and between two of the four radial projections, said headed projection and four radial projections having respective axes lying on a common conical surface.

7. A milker claw comprising a body having a central portion, a plurality of projections having passages therein extending from said central portion along axes lying on the surface of the same imaginary cone, and a projection extending outwardly from the apex of the said cone and having a passage therein in communication with the passages in said projections, said central portion having a plurality of passages with axes lying on the surface of a second imaginary cone lying within and extending in the same direction as the first imaginary cone and a further passage extending from the apex of the second imaginary cone in communication with the last mentioned passages and in direct alinement with one of them through the first imaginary cone to the outside of the central portion.

8. A milker claw comprising a body having a central portion, a plurality of projections having passages therein extending from said central portion along axes lying on the surface of an imaginary cone, a projection extending outwardly from the apex of said cone and having a passage therein in communication with the passages in said projections, said central portion having a plurality of passages with axes lying on the surface of a second imaginary cone lying within and extending in the same direction as the first imaginary cone and a further passage extending from the apex of the second imaginary cone in communication with the last mentioned passages through the first imaginary cone, and a projection extending from the central portion of the body generally parallel to the projection extending from the apex of the first imaginary cone and having a passage in communication with the passage through the body extending from the apex of the second imaginary cone.

9. A milker claw comprising a body having a central portion, a plurality of vacuum nipples extending generally from a common point in said central portion to one side of a plane containing the common point, a main vacuum supply nipple in communication with said vacuum nipples extending from the common point on the opposite side of said plane, a plurality of air nipples extending from a second common point within the central portion to one side of a second common plane containing the second common point, and a main air supply nipple extending from the central portion and communicating with the air nipples by means of a passage in the central portion extending from the common point of the air nipples directly between two adjacent vacuum nipples.

10. A milker claw comprising a body having a central portion, a plurality of vacuum nipples extending substantially radially and generally from a common point within the body, a supply vacuum nipple in communication with each of the nipples and extending substantially at right angles thereto, a plurality of air nipples extending generally from a different point within the central portion, and an air supply nipple extending from the central portion parallel to the vacuum supply nipple and being in communication with the air nipples by means of a passage extending through the central portion directly between two adjacent vacuum nipples.

FLOYD G. HODSDON.